Dec. 12, 1961  G. F. WILLIAMS  3,012,731
HOSE-DIRECTING DEVICE
Filed June 22, 1959
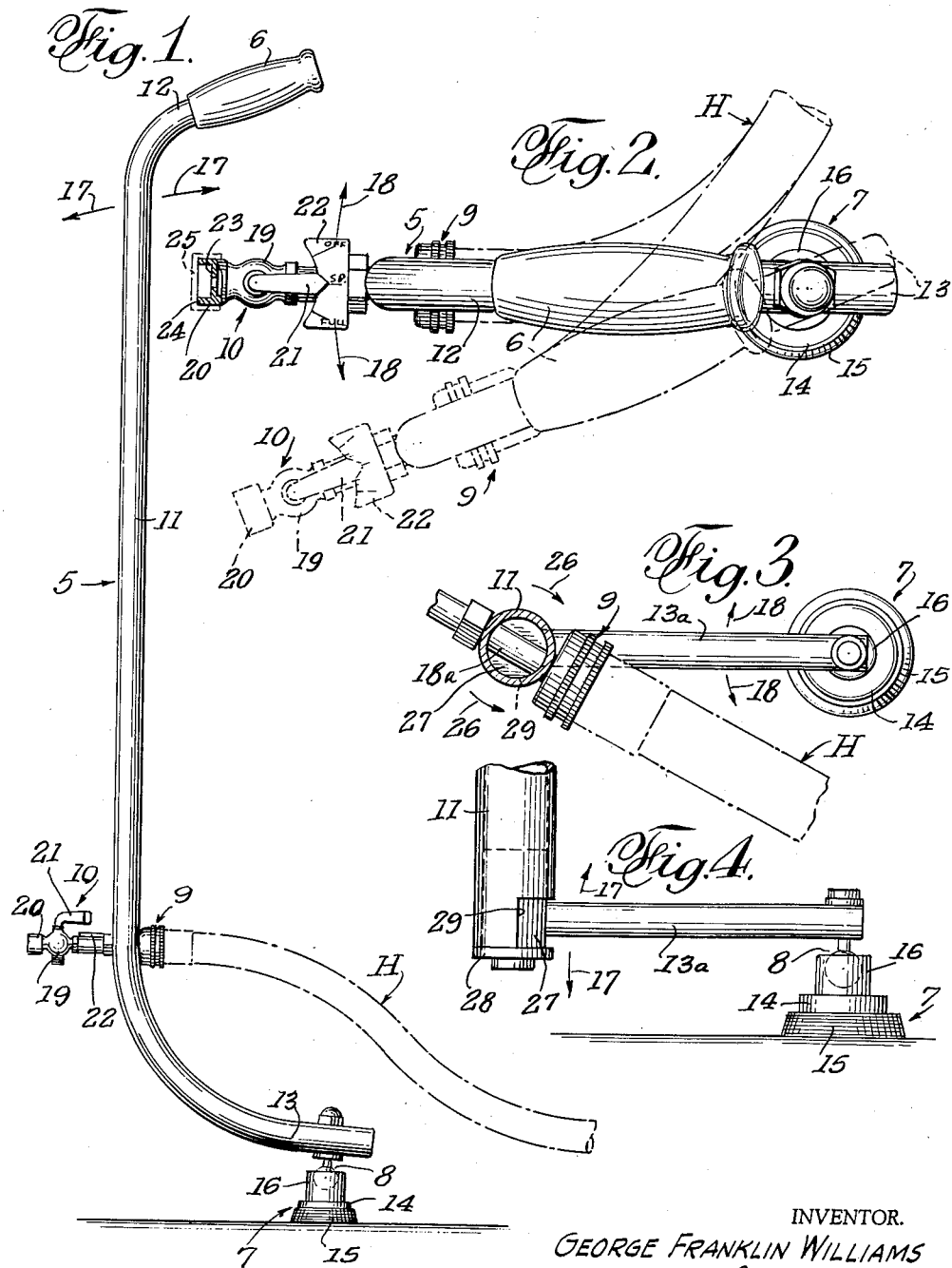
INVENTOR.
GEORGE FRANKLIN WILLIAMS
BY C. G. Stratton
ATTORNEY

United States Patent Office 3,012,731
Patented Dec. 12, 1961

3,012,731
HOSE-DIRECTING DEVICE
George Franklin Williams, 24747 N. San Fernando Road, Newhall, Calif.
Filed June 22, 1959, Ser. No. 821,906
7 Claims. (Cl. 239—280)

This invention relates to a device for directing a stream or spray of water and has for an object to provide a portable hand-manipulatable support device that enables direction of a spray, as desired, while the person handling the device remains in a comfortable and upright position. Accordingly, the invention contemplates means for spraying and/or water-sweeping grass cuttings, leaves and other debris from beneath parked vehicles and from other confined places while comfortably erect.

Another object of the invention is to provide a device of the character above indicated that is adapted to be manipulated by one hand, has univresal adjustability of position and is operated with a minimum of effort.

A further object of the invention is to provide a hose-directing device that conveniently combines hose-supporting and -directing features with stream or spray adjusting means that are readily controlled to obtain the type of spray or stream desired.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes, preferred embodiments of the present invention, which are given by way of illustration or example only.

In the drawing, like reference characters designate similar parts in the several views.

FIG. 1 is a side elevational view of a hose-directing device according to the present invention.

FIG. 2 is an enlarged plan view thereof, the device being shown in two of its many different directional positions.

FIG. 3 is a plan sectional view of a modification.

FIG. 4 is a side elevational view of the device, as shown in FIG. 3.

The device that is illustrated in the drawing comprises, generally, an elongated body 5 terminating at one end in a hand grip 6, a support 7 connected to the other end of the body by a universal connection 8, a hose connection 9 provided on the body 5 more nearly adjacent to the support 7 than to the hand grip 6, and a fitting 10 that receives flow from a hose H connected to the connection 9 to both control the amount of said flow and the character thereof. The assembled device is readily portable, but in use its weight is rested on the ground.

The body 5 is shown in FIGS. 1 and 2 and preferably comprises an elongated tube that has a straight portion 11 and angularly directed or bent end portions 12 and 13 both bent in the same plane and in the same direction. The hand grip 6 is provided on the end portion 12 which is preferably somewhat lesser in extent than is the bent portion 13.

The support 7 is shown in the form of a foot 14 that is preferably enclosed in a rubber or similar pad 15 and has an upper housing extension 16. The particular design of the support 7 is variable, but the same is preferably of the non-slippage type shown wherein the pad 15 may be replaced when worn. In any case, said support provides a foot for the device that is adapted for use on sod as well as paved surfaces.

The universal connection 8 is shown as a ball and socket that connects said support 7 and the bent end portion 13 of the body 5. Said connection, regardless of its particular form or design, provides for the body 5 to be swung back and forth in the direction of the arrows 17, as well as to be turned around the pivot afforded by the connection 8 in the direction of the arrows 18. Said body 5 may also be swung in a p'ane transverse to the plane of arrows 17. Thus, the body, when held by the hand grip 6, may be moved in all directions relatively to the support 7, as desired.

The hose connection 9 is shown as a conventional internally threaded union nut that is capable of rotation on the end of a pipe 18a (FIG. 3) so as to effect connection with a hose H. Said connection 9 is preferably disposed on the side toward which the ends 12 and 13 are bent, the hose, thereby, extending in the same direction.

The fitting 10 is mounted as an extension of said pipe 18a on the opposite side of the body 5 from where the connection 9 is located. Said fitting comprises a cock 19 and a spray-forming nozzle 20 at the outlet thereof.

A control handle 21 of the cock 20 is associated with a dial 22 to guide the position of the hand 21 according to whether a spray or stream of water is desired to be emitted at the nozzle 20. Rather than having the control afforded by rotationally adjustable nozzles, the present handle setting is relatively simple and easily accomplished from a position while grasping the grip 6.

The nozzle 20 may be variously formed. The same is here shown with an orifice plate 23 enclosed within a tubular housing 24 and through which the water stream or spray passes, according to the setting of the cock, as above described. Damage to the nozzle may be obviated by a removable protective cap 25.

It will be realized that the emissions at nozzle 20 may be directed as desired merely by manual manipulation of the device by means of hand grip 6 on its universal mount 8 and that the same is especially efficacious for sweeping cuttings, leaves and other debris from beneath vehicles and from other confined places while the person operating the device is comfortably erect.

In the modification of FIGS. 3 and 4, the elongated portion 11 of the body may additionally be turned on it axis, as indicated by the arrows 26. In this construction, the portion 13a of the body is formed as a separate rod that has a swivel connection with the body part 11, a block 27 being provided on the end of said rod 13a and rotationally fitted in part 11. A cap plate 28 retains the assembly. By providing a lost-motion cut-out 29 in body part 11, the body may be turned on its axis as limited by the opposite edges of the cut-out and the engagement thereof with one side or the other of the rod 13a. In other respects, the modification may follow the construction of FIGS. 1 and 2 and may have all the other adjustments of position and direction of the nozzle. It is to be noted that by placing the nozzle toward the lower end of the body, the reaction of the jet of water is easily overcome by the leverage afforded the user by the longer upper portion of the body.

While the body 5 may advantageously and economically be made of a single length of tubing, as shown, it will be understood that the area around the elements 9 and 10 may be designed more elaborately to comprise a housing for the valve 19 to which tubular portions 11 and 13 may be connected.

While the foregoing specification illustrates and describes what I now contemplate to be the best modes of carrying out my invention, the constructions are, of course, subject to modification without departing from the spirit and scope of my invention. Therefore, I do not desire to restrict the invention to the particular forms of construction illustrated and described, but desire to cover all modifications that may fall within the scope of the appended claims.

Having thus described the invention, what is claimed and desired to be secured by Letters Patent is:

1. A portable manually operated hose-directing device comprising an elongated body which is formed to have end portions directed out of the general line of elongation of the body, one of said end portions providing a hand grip, a support adapted to rest on the ground and to frictionally resist movement in a horizontal plane, a universal connection between the other of said end portions and said ground support whereby the body is universally movable about the ground support, means for connecting a hose to the lower end of the body, and a valve-controlled, generally horizontal nozzle on the body and receiving flow from said hose through the hose-connecting means.

2. A hose-directing device according to claim 1 in which a swivel is provided to connect the end portion having the universal connection and the adjacent end of the body.

3. A portable manually operated hose-directing device comprising an elongated, straight, body having end portions similarly directed out of line with the straight body, a hand grip on one end portion, a universally-connected support foot adapted to rest on the ground and to frictionally resist movements in a horizontal plane on the other portion, a valve-controlled generally horizontal nozzle provided on the body adjacent the second end portion and directed oppositely to the direction of said end portions, and a hose connection for said nozzle on the side of the body opposite to the nozzle.

4. A portable manually operable hose-directing device comprising an elongated, straight, body having end portions similarly directed out of line with the straight body, a hand grip on one end portion, a universally-connected support foot adapted to rest on the ground and to frictionally resist movements in a horizontal plane on the other portion, a cock provided on the body adjacent the second end portion, a pipe extending transversely through the body and provided with a connection element for a hose whereby flow from the hose is controlled by the cock, and a spray-forming generally horizontal nozzle on the outlet end of the cock.

5. In a portable, manually operated hose-directing device, an elongated body having a straight intermediate part and upper and lower ends directed in the same plane and directed out of line of the intermediate part, a hand grip on the upper end, a universal joint on the lower end, a support foot adapted to rest on the ground and to frictionally resist movements in a horizontal plane connected by said joint to said lower end, a hose connection on said intermediate body part adjacent the lower end, and a valve-controlled generally horizontal nozzle for receiving flow from a connected hose, and means mounted on said nozzle for controlling the character of the flow from said nozzle.

6. A hose-directing device comprising an elongated, upright body member, a rearwardly extending handle at the upper end of the body, a rearwardly extending support at the lower end of the body, a base member universally connected with the said support at a point substantially rearwardly of the body member, and a nozzle extending forwardly from the body is to be connected with a rearwardly extending hose, the body member and nozzle overhanging the space in front of the base member to resist rearward thrust of water flowing from the nozzle.

7. A hose-directing device comprising an elongated, upright body member, a rearwardly extending handle at the upper end of the body, a rearwardly extending support at the lower end of the body, a base member universally connected with the said support, and a nozzle extending forward from the body to be connected with a rearwardly extending hose, the center of gravity of the body, handle, nozzle and support being ahead of the base so that when there is no water flowing through the nozzle said members tend to fall by gravity to a position in which the nozzle is inclined downwardly.

References Cited in the file of this patent

UNITED STATES PATENTS

| | | |
|---|---|---|
| 350,569 | Strobel | Oct. 12, 1886 |
| 1,031,176 | Gilpin | July 2, 1912 |
| 1,052,620 | Price | Feb. 11, 1913 |
| 1,184,274 | Thompson | May 23, 1916 |
| 1,476,810 | Gilsenan | Dec. 11, 1923 |
| 1,598,010 | Price | Aug. 31, 1926 |
| 1,614,520 | Brown | Jan. 18, 1927 |
| 2,135,145 | Reed | Nov. 1, 1938 |
| 2,395,178 | Fiori | Feb. 19, 1946 |
| 2,607,622 | Doepke | Aug. 19, 1952 |
| 2,631,062 | Tiedemann et al. | Mar. 10, 1953 |

FOREIGN PATENTS

| | | |
|---|---|---|
| 586,848 | Germany | June 27, 1934 |